United States Patent [19]

Kohama et al.

[11] 4,393,702
[45] Jul. 19, 1983

[54] GAS FLOW MEASURING DEVICE

[75] Inventors: Tokio Kohama, Nishio; Hideki Obayashi, Okazaki; Hisasi Kawai, Toyohashi; Tsuneyuki Egami, Aichi, all of Japan

[73] Assignee: Nippon Soken, Inc., Nishio, Japan

[21] Appl. No.: 242,563

[22] Filed: Mar. 11, 1981

[30] Foreign Application Priority Data

Mar. 21, 1980 [JP] Japan ............................ 55-36614
May 14, 1980 [JP] Japan ............................ 55-64427

[51] Int. Cl.³ .............................................. G01F 1/68
[52] U.S. Cl. ............................................ 73/204; 73/118
[58] Field of Search ................................. 73/118, 204

[56] References Cited

U.S. PATENT DOCUMENTS 4,024,761 5/1977 Djorup ................................. 73/204
4,089,214 5/1978 Egami et al.
4,283,944 8/1981 Gruner ................................ 73/204

OTHER PUBLICATIONS

Malin et al., "Mass Flow Meter", IBM Technical Disclosure Bulletin, vol. 21 #8 1/79, p. 3227.

Primary Examiner—Herbert Goldstein
Attorney, Agent, or Firm—Cushman, Darby & Cushman

[57] ABSTRACT

A first temperature dependent resistor, an electric heater and a second temperature dependent resistor are arranged in this order within and from the downstream to the upstream of a pipe in which flows a gas whose flow rate is to be measured. A bridge circuit is formed by the first and second temperature dependent resistors along with first and second reference resistors. In response to the output of the bridge circuit, a measuring circuit regulates the supply of power to the electric heater and generates a signal indicative of the flow rate of the gas. Each of the first and second reference resistors is in the form of a film resistor formed on an insulating base. The insulating base having the film resistors formed thereon is placed for example in the flow of the gas to be measured. Each of the first and second temperature dependent resistors and the electric heater includes a resistance wire of a platinum alloy containing platinum and a predetermined proportion of another metal such as nickel, rhodium, iridium, palladium or ruthenium.

9 Claims, 23 Drawing Figures

GAS FLOW MEASURING DEVICE

BACKGROUND OF THE INVENTION

This invention is related to co-pending U.S. application Ser. No. 92,024 filed on Nov. 7, 1979 and assigned to the same assignee.

This invention relates to gas flow measuring devices and more particularly to a device for measuring, for example, the flow rate of air drawn into an engine.

In the past, a device has been proposed which comprises a flow measuring pipe disposed in the intake pipe of an engine, and an electric heater and first and second temperature dependent resistors which are disposed in the flow measuring pipe, whereby the flow rate of air (the gas to be measured) is measured in accordance with the output signals of the heater and the resistors.

While this known device has the advantages of being small and simple in construction and capable of accurately measuring the flow rate, it is disadvantageous in that to ensure the desired measuring accuracy it is necessary to considerably reduce the difference in temperature coefficients between at least two reference resistors forming a bridge with the first and second temperature dependent resistors. That is, the difference in temperature coefficients of the reference resistors must be reduced to less than 1 PPM/°C. in order to keep the flow measuring accuracy within ±2% against variations in the external conditions.

As a result, in the case of the prior art device, it has been the practice to use carefully selected reference resistor elements to reduce the difference in temperature coefficients to less than 1 PPM/°C. This has given rise to serious difficulties from the standpoint of manufacturing cost and the like.

Another disadvantage is that if the device is used in environmental conditions such as existing in an engine compartment where the temperature changes rapidly, the temperature of the atmosphere surrounding the reference resistors changes so that even if the difference in temperature coefficients of the reference resistors is kept less than 1 PPM/°C., the accuracy of flow measurement deteriorates due to differences in the temperatures of the reference resistors.

SUMMARY OF THE INVENTION

With a view to overcoming the foregoing deficiencies in the prior art, it is an object of this invention to provide an improved gas flow measuring device comprising an electric heater disposed within a flow measuring pipe, a first temperature dependent resistor positioned downstream of the electric heater, a second temperature dependent resistor positioned so as to be not influenced thermally by the electric heater, and at least two reference resistors associated with the first and second temperature dependent resistors to form a bridge, each of the reference resistors being comprised of a film resistor element deposited by evaporation, printing or the like on a base of an insulating material, e.g., ceramic, whereby the difference in temperature coefficient between the reference resistors is easily reduced to a very small value so that even if the device is used in circumstances where the temperature of the atmosphere tends to change rapidly, the reference resistors are each placed in the atmosphere of substantially the same temperature and a satisfactory accuracy of flow rate measurement is ensured in all the circumstances.

It is another object of this invention to provide such a measuring device wherein the insulating base having the film resistor elements deposited thereon is further coated with an insulating material such as resin, thus making the film resistor elements less susceptible to the effect of the rapidly changing external air temperature.

It is still another object of this invention to provide such measuring device wherein the insulating base having the film resistor elements deposited thereon is placed in the midst of the flow of gas to be measured, where there is no gas stagnation and rapid temperature changes owing to the flow of the gas, thus preventing the film resistor elements from being subjected to any rapid external air temperature changes due to the stagnation of the gas.

DESCRIPTION OF THE PREFERRED EMBODIMENTS

This invention will now be described in greater detail with reference to the illustrated embodiments.

Figure 1:
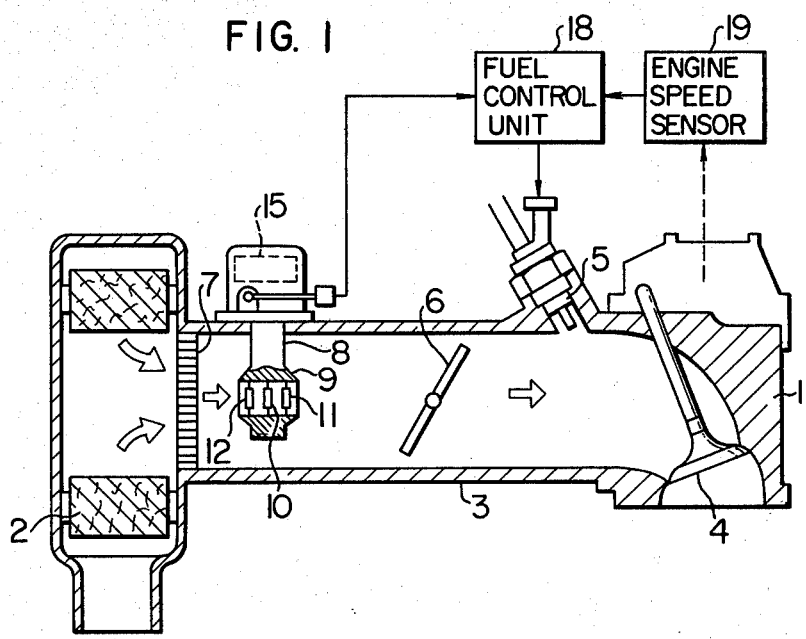
FIG. 1 is a schematic diagram showing the overall construction of a first embodiment of this invention.

Referring to FIG. 1 showing a first embodiment of this invention, an engine 1 is an automobile engine of the spark ignition type, in which the air for combustion purposes is drawn via an air cleaner 2, an intake pipe (e.g. manifold) 3 and intake valve 4. The fuel is supplied by injecting it via electromagnetic fuel injection valves 5 mounted to the intake pipe 3.

Disposed in the intake pipe 3 is a throttle valve 6 which is operable as desired by the driver. Also disposed at the joint of the intake pipe 3 and the air cleaner 2 is a flow rectifying device 7 for rectifying the air flow.

A small flow measuring pipe 9 is positioned by a support 8 between the flow rectifying device 7 and the throttle valve 6 within the intake pipe 3 to extend substantially parallel to the axial direction of the pipe 3. Although shown schematically, an electric heater 10 comprising a platinum resistance wire is disposed inside the flow measuring pipe 9, and a first temperature dependent resistor 11 comprising a platinum resistance wire is positioned near to and downstream of the electric heater 10. A second temperature dependent resistor 12 comprising a platinum resistance wire is positioned at some distance from and upstream of the electric heater 10.

Figure 3:
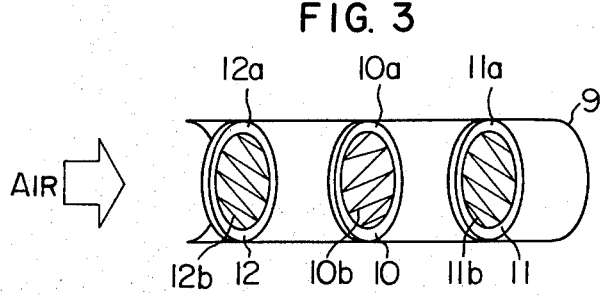
FIGS. 3 and 4 are respectively a perspective view and a front view of the electric heater and the first and second temperature dependent resistors.
Figure 4:
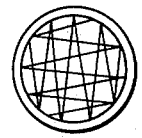

As shown in FIG. 3, the electric heater 10 and the first and second temperature dependent resistors 11 and 12 respectively comprise platinum resistance wires 10b, 11b and 12b which are respectively arranged in a lattice pattern on ring-shaped printed wiring boards 10a, 11a and 12a, and in particular the first and second temperature dependent resistors 11 and 12 are comprised of the platinum resistance wires having the same resistance temperature characteristic. Also the electric heater 10 and the first temperature dependent resistor 11 are arranged so that when looked from the front (or back) side, their resistance wires cross each other as shown in FIG. 4 and thus the first temperature dependent resistor 11 is not subject to the effects of a small heat distribution within flow measuring pipe 9.

Referring again to FIG. 1, the electric heater 10 and the first and second temperature dependent resistors 11 and 12 are all connected to a measuring circuit 15 within a case. Measuring circuit 15 generates an electric signal indicative of the flow rate of the air drawn.

Figure 2:
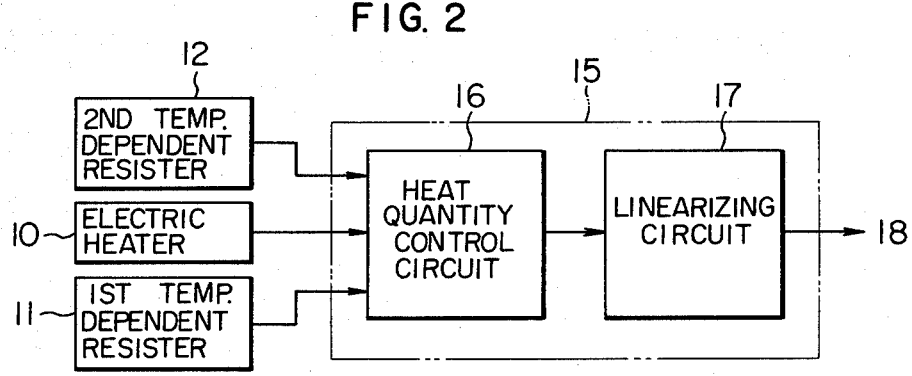
FIG. 2 is a block diagram showing the measuring circuit shown in FIG. 1.

As shown in FIG. 2, the measuring circuit 15 comprises a heat quantity control circuit 16 and a linearizing circuit 17. Heat quantity control circuit 16 is responsive to the output signal of a bridge including the first and second temperature dependent resistors 11 and 12 and controls the voltage applied to the electric heater 10 and the bridge. Linearizing circuit 17 provides compensation so that the output signal of the heat quantity control circuit 16 is made linear with the flow rate of the intake air.

In FIG. 1, a fuel control unit 18 is responsive to the output signal of the measuring circuit 15 to control the duration of opening of the electromagnetic fuel injection valves 5 and the circuit also receives other signals including the detection signal of an engine speed sensor 19 for detecting the rotational speed of the engine 1. The engine speed sensor 19 may for example be a known type of ignition detection circuit which generates ignition pulse signals.

Figure 5:
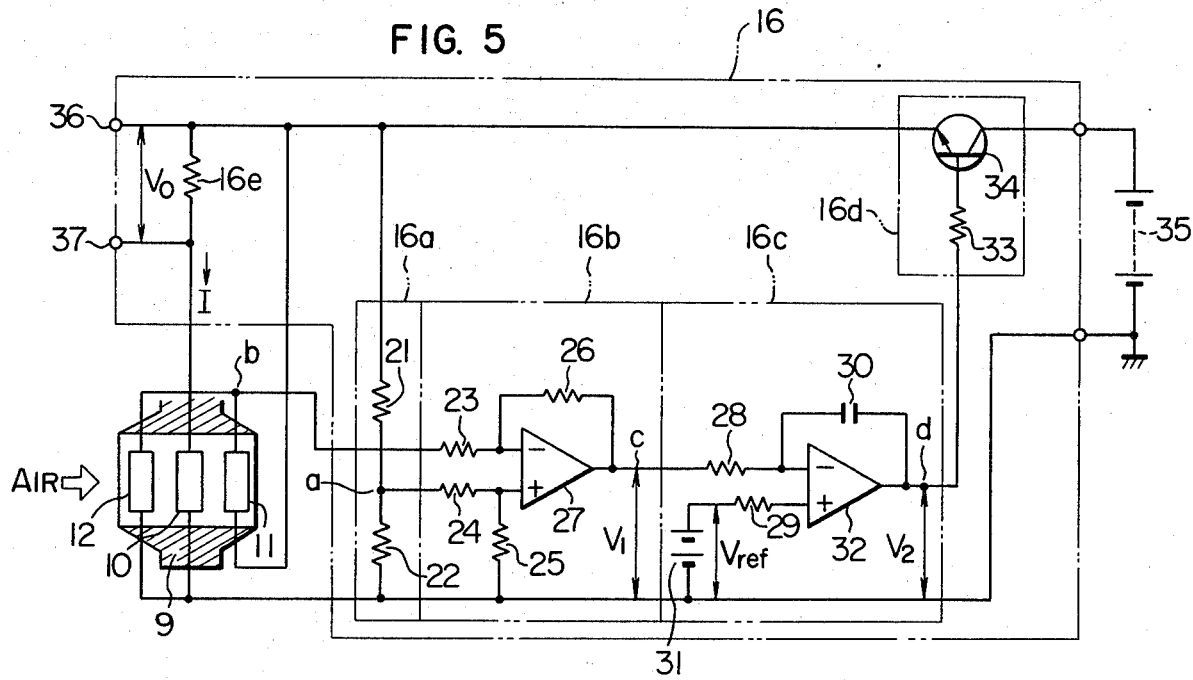
FIG. 5 is a circuit diagram of the heat quantity control circuit shown in FIG. 2.

Referring now to FIG. 5, the heat quantity control circuit 16 will be described. The heat quantity control circuit 16 mainly comprises a reference resistor unit 16a, a first differential amplifier circuit 16b, a second differential amplifier circuit 16c, a power amplifier circuit 16d and an output resistor 16e.

Of these component elements, the reference resistor unit 16a comprises reference resistors 21 and 22, connected to a bridge with and the first and second temperature dependent resistors 11 and 12.

Figure 6:
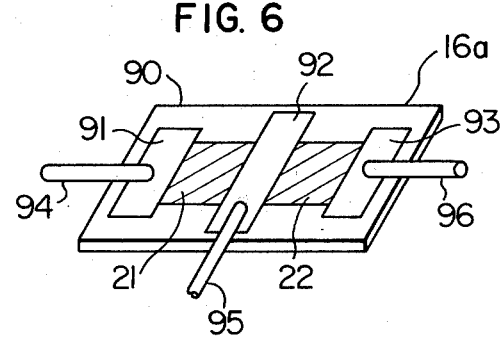
FIG. 6 is a perspective view of the reference resistor unit shown in FIG. 5.

The reference resistors 21 and 22 of the bridge will now be described with reference to FIG. 6. The reference resistors 21 and 22 are deposited as film resistors on a ceramic base 90 by evaporation or printing. Numerals 91, 92 and 93 designate conductors, and lead wires 94, 95 and 96 are respectively connected to the conductors 91, 92 and 93 by soldering. In this case, since the thickness of the ceramic base and the film thickness of the resistors can be made substantially constant, the difference in temperature coefficient between the film resistors can be made very small.

Referring again to FIG. 5, the first differential amplifier circuit 16b comprises input resistors 23 and 24, a grounding resistor 25, a negative feedback resistor 26 and an operational amplifier 27 (hereinafter referred to as an OP AMP). The voltage across the diagonal points a and b of the bridge is differentially amplified and generated at a terminal c.

The second differential amplifier circuit 16c comprises input resistors 28 and 29, a capacitor 30, reference voltage source 31 and an OP AMP 32. The output voltage at the terminal c and a fixed reference voltage Vref of the reference voltage source 31 are differentially amplified to generate the resulting voltage at a terminal d. The capacitor 30 is provided to prevent oscillations of the device of this embodiment.

The power amplifier circuit 16d comprises a resistor 33 and a power transistor 34, whereby the power is supplied to the power transistor 34 from a battery 35 and the output voltage of the second ampifier circuit 16d is subjected to power amplification, thus applying the resulting output to the bridge and the electric heater 10.

The output resistor 16e is provided to apply to the linearizing circuit 17 a voltage related to the flow rate of the air drawn and it is connected in series with the electric heater 10. The output resistor 16e has its terminals 36 and 37 connected to the linearizing circuit 17.

Figure 7:
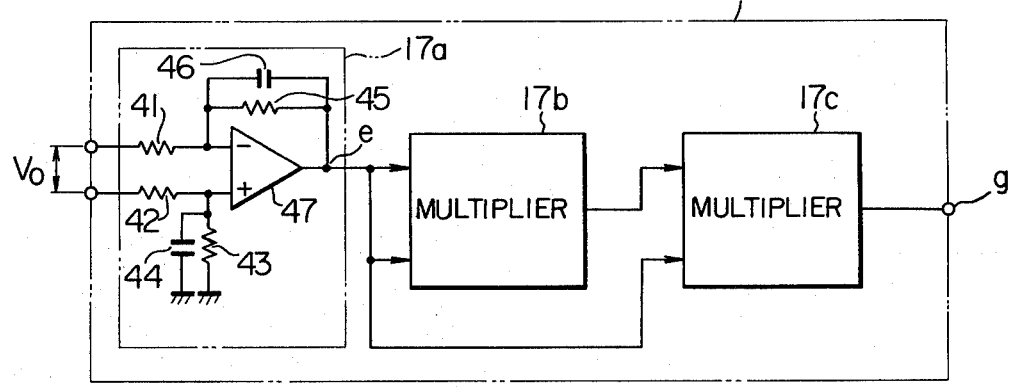
FIG. 7 is a circuit diagram of the linearizing circuit shown in FIG. 2.

Next, the linearizing circuit 17 shown in FIG. 7 will be described. The linearizing circuit 17 mainly comprises a differential amplifier circuit 17a and multipliers 17b and 17c. Of these components, the differential amplifier circuit 17a comprises input resistors 41 and 42, a grounding resistor 43, a grounding capacitor 44, a negative feedback resistor 45, a capacitor 46 and an OP AMP 47, whereby the output voltage of the heat quantity control circuit 16 is differentially amplified and generated at its terminal e.

Each of the multipliers 17b and 17c is of a known analog type which multiplies its two input voltages, and a voltage corresponding to the resulting product value is generated at a terminal g. Thus, the voltage at the terminal e is multiplied twice by itself and generated at the terminal g.

With the construction described above, the operation of the embodiment is as follows. In FIG. 1, the air is drawn into the engine 1 through the air cleaner 2 and the intake pipe 3 at the flow rate determined by the opening of the throttle valve 6. Of the total air drawn, a fixed proportion is drawn into the engine 1 through the flow measuring pipe 9.

Inside the flow measuring pipe 9, the second temperature dependent resistor 12 positioned upstream of the electric heater 10 is influenced by the temperature of the air drawn, and the first temperature dependent resistor 11 positioned downstream of the electric heater 10 is influenced by the temperature of the air drawn and the heat quantity generated by the electric heater 10, that is, it is influenced by the temperature of the air heated by the electric heater 10.

As a result, a temperature difference ΔT occurs between the first and second temperature dependent resistors 11 and 12, which is related to the amount of power P(W) supplied to the electric heater 10 and the flow rate of intake air G(g/sec). In this case, the relation as shown by the following equation exists among P, G and $\Delta T$ $$K_1 \cdot \Delta T = P/G \qquad (1)$$

where $K_1$ is a constant.

Since the electric resistance value of each of the first and second temperature dependent resistors 11 and 12 varies in accordance with the air temperature, as will be seen from the following equation (2), a potential difference $\Delta V$ occurs across the points a and b of the bridge, which is determined by the temperature difference $\Delta T$ and the voltage V applied to the bridge.

$$\Delta V = K_2 \cdot \Delta T \cdot V \qquad (2)$$

where $K_2$ is a constant.

Thus, the following relationship or equation is derived from the equations (1) and (2)

$$K_3 \cdot \Delta V/V = P/G \qquad (3)$$

where $K_3$ is a constant.

As a result, if the power supply P to the electric heater 10 and the bridge applied voltage V is controlled to maintain the potential difference $\Delta V$ constant, the relation as shown by the following equation will occur among the intake air flow rate G, the power supply P and the bridge applied voltage V $$G = K_4 \cdot P \cdot V \qquad (4)$$

where $K_4$ is a constant.

If the resistance value of the output resistor 16e is selected to have a value smaller than that of the electric heater 10 and if I represents the current flowing in the electric heater 10, then the following equations (5) and (6) hold $$P \approx K_5 \cdot I^2 \qquad (5)$$

$$V \approx K_6 \cdot I \qquad (6)$$

where $K_5$ and $K_6$ are constants. Thus, the equation (4) is represented by the following equations $$G \approx K \cdot I^3 \qquad (7)$$

$$\approx K' \cdot V^3 \qquad (8)$$

where K and K' are constants. Then, the intake air flowrate G is a function of the cube of the current I (or the voltage V). Although the equations (7) and (8) are approximate equations, the approximations are so close that there will be no detrimental effect from measurement point of view and thus there will be no difficulty from practical point of view.

Thus, the heat quantity control circuit 16 controls the heat quantity generated by the electric heater 10 to maintain the potential difference $\Delta V$ at a fixed value. More specifically, when the intake air flow rate increases, the temperature rise of the air heated by the electric heater 10 is decreased so that the temperature difference $\Delta T$ between the first and second temperature dependent resistors 11 and 12 is decreased and the potential difference $\Delta V$ between the bridge points a and b is also decreased.

As a result, the output voltage $V_1$ of the first differential amplifier circuit 16b is decreased, and the output voltage $V_2$ of the second differential amplifier circuit 16c for generating a voltage corresponding to (Vref$-V_1$) is increased. When this occurs, the power amplifier circuit 16d increases the current supplied to the electric heater 10 with the resulting increase in the heat quantity generated by the electric heater 10.

Consequently, the temperature difference $\Delta T$ between the first and second temperature dependent resistors 11 and 12 is increased and the potential difference $\Delta V$ between the bridge points a and b is also increased. Thus, when the potential difference $\Delta V$ becomes equal to the reference voltage Vref, a stable condition is established in which the system is balanced on the whole and the bridge itself is unbalanced.

On the other hand, a decrease in the intake air flow rate results in an increase in the temperature rise of the air heated by the electric heater 10, so that the temperature difference $\Delta T$ between the first and second temperature dependent resistors 11 and 12 is increased and the potential difference $\Delta V$ is increased.

As a result, the output voltage $V_1$ of the first differential amplifier circuit 16b is increased and the output voltage $V_2$ of the second differential amplifier circuit 16c is decreased. When this occurs, the current supplied to the electric heater 10 is decreased by the heat quantity generated by the electric heater 10 is also decreased.

Consequently, the temperature difference $\Delta T$ is decreased and the potential difference $\Delta V$ is decreased, thus stabilizing both the system and the bridge with the potential difference $\Delta V$ being equal to the reference voltage Vref.

In this way, the potential difference $\Delta V$ between the bridge points a and b is always maintained at the fixed value Vref irrespective of the intake air flow rate, so that the equation (7) is established and the intake air flow rate G is represented as a function of the cube of the current I flowing to the electric heater 10.

This current I also flows to the output resistor 16e so that the current I is proportional to the terminal voltage $V_o$ of the output resistor 16e and the cube of the voltage $V_o$ is proportional to the intake air flow rate G.

Thus, the output voltage $V_o$ of the heat quantity control circuit 16 is cubed by the linearizing circuit 17. More specifically, the terminal voltage of the output resistor 16e in the heat quantity control circuit 16 is amplified by the differential amplifier circuit 17a, thus generating at its terminal e a voltage corresponding to $A_1 \cdot V_o$. Here, $A_1$ is the amplification factor of the circuit 17a.

This output voltage $A_1 \cdot V_o$ is applied to the two input terminals of the multiplier 17b which in turn generates a voltage corresponding to $A_1^2 \cdot V_o^2$. The voltage $A_1 \cdot V_o$ and the voltage $A_1^2 \cdot V_o^2$ are applied to the multiplier 17c which in turn generates a voltage corresponding to $A_1^3 \cdot V_o^3$.

In this way, the linearizing circuit 17 generates at its output terminal g a voltage $V_g$ which is proportional to the cube of the voltage $V_o$ or the Voltage $V_g$ which is proportional to the intake air flow rate.

Then, the voltage $V_g$ is applied to the fuel control unit 18 as a signal indicative of the intake air flow rate G so that in response to this signal and the output signal of the engine speed sensor 19 the fuel control unit 18 generates an injection pulse signal to open the fuel injection valve 5.

Figure 8:
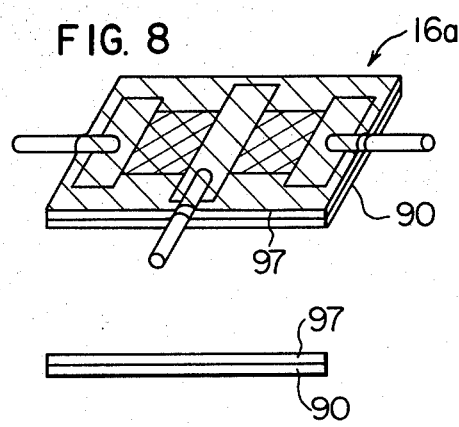
FIG. 8 is a perspective view of the reference resistor unit used in a second embodiment of this invention.

While, in the above-described first embodiment, the reference resistors comprise the film resistors deposited on the ceramic base 90, in accordance with the second embodiment shown in FIG. 8 the ceramic base 90 having the reference resistors deposited thereon is covered with an insulating material 97 such as glass or resin. The remaining construction is the same with the first embodiment.

Figure 9:
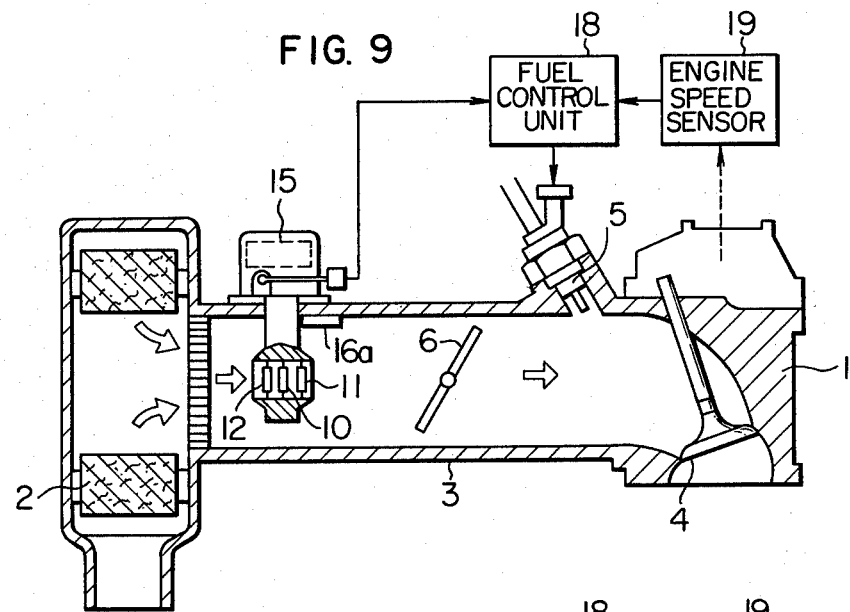
FIG. 9 is a schematic diagram showing the overall construction of a third embodiment of this invention.

In the third embodiment shown in FIG. 9, the reference resistor unit 16a including the reference resistors is mounted on the inner wall of the intake pipe 3 at a position where the air flow does not stagnate, so that the reference resistors are less influenced by any rapid change of the external air temperature and this is preferable from the standpoint of accuracy.

Figure 10:
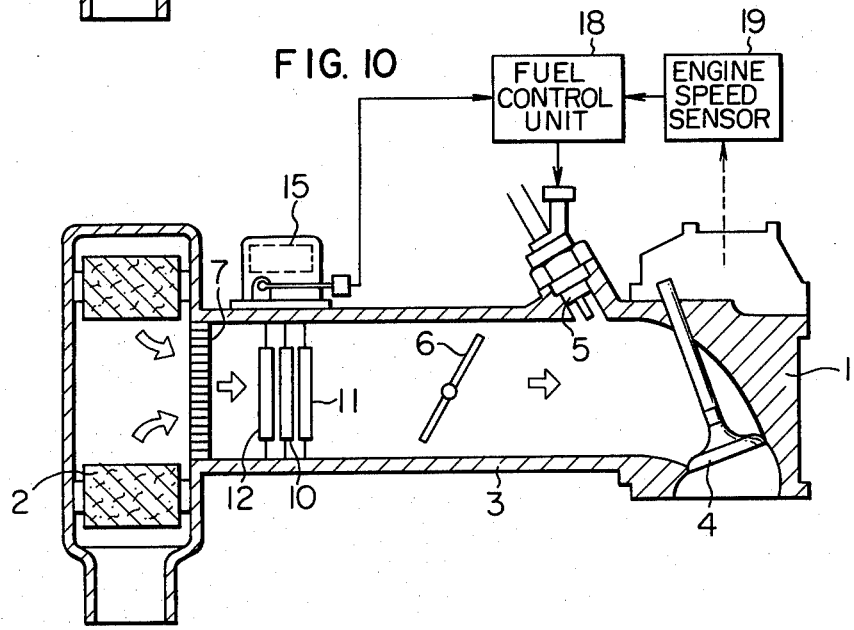
FIG. 10 is a schematic diagram showing the overall construction of a fourth embodiment of this invention.

While, in the above-described three embodiments, the flow measuring pipe 9 is separately disposed within the intake pipe 3 and the electric heater 10 and the first and second temperature dependent resistors 11 and 12 are arranged within the pipe 9 so as to measure the flow rate, in the fourth embodiment shown in FIG. 10 the electric heater 10 and the first and second temperature dependent resistors 11 and 12 are directly arranged within the intake pipe 3 which also serves as the flow measuring pipe.

Figure 11:
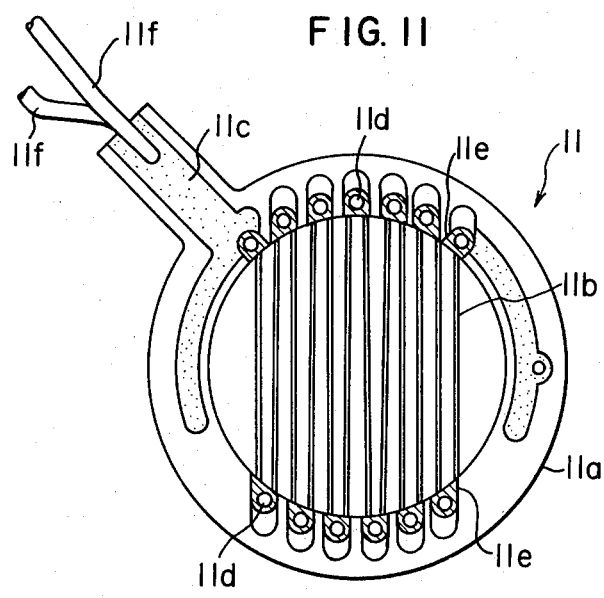
FIGS. 11 and 12 are respectively a front view and a sectional view showing a modification of the temperature dependent resistor shown in FIG. 1.
Figure 12:
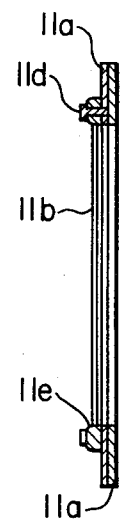

FIGS. 11 and 12 show a modification of the first temperature dependent resistor 11, in which numeral 11a designates a ring-shaped base of an electrically insulating material such as ceramic, glass-reinforced epoxy or synthetic resin and two pieces of the base cemented together with an adhesive to ensure the desired strength.

Electrodes 11c made from nickel, gold, silver or copper are formed on the surface of the base 11a, and attached by soldering to the portions including the electrodes 11c are thirteen support pieces 11d made from Kovar, nickel, copper or the like and having a T-shape in cross-section.

The temperature dependent resistance wire 11b is fastened to the support pieces 11d and stretched in a striped pattern, and those portions of the resistance wire 11b which are overlapping the base 11a and not practically exposed to the air flow are covered with a conductive cementing material 11e such as solder or silver paste thus fastening resistance wire 11b to the support pieces 11d.

Figure 13:
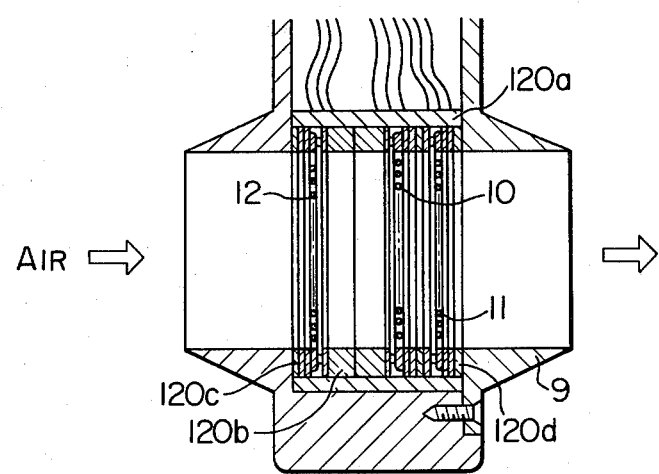
FIG. 13 is an enlarged sectional view of a principal part of a fifth embodiment of this invention.

The electric heater resistor 10 and the second temperature dependent resistor 12 are also stretched in the similar pattern as the resistor 11, and the resistors 10, 11 and 12 attached to the bases are enclosed by rubber cushions 120a to 120d and disposed within the flow measuring pipe 9 as shown in FIG. 13.

Figure 14A:
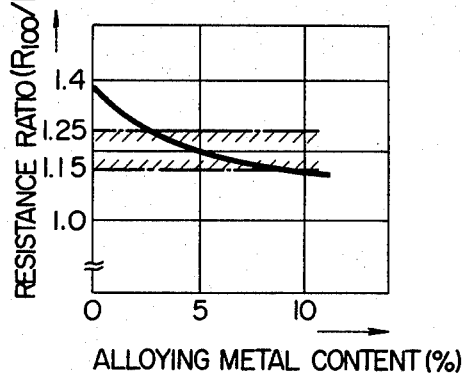
FIGS. 14A and 14B are characteristic diagrams showing respectively the relationship between the nickel content and resistance ratio and the relationship between the nickel content and tensile strength, of the resistance wires shown in FIG. 1.
Figure 14B:
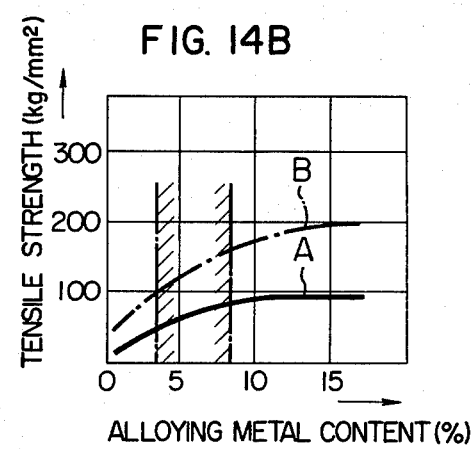

The resistance wires 10b, 11b and 12b used in the embodiments of this invention may each be comprised of a resistance wire of a platinum alloy having a nickel (Ni) content of 3 to 8%. In consideration of experimental results, the alloy metal content is selected such that a temperature coefficient indicative resistance ratio $R_{100}/R_0$ ($R_0$ and $R_{100}$ respectively indicate the resistance value at 0° and 100° C., respectively) is held in the practically required range of 1.15 to 1.25 as shown in FIG. 14A, and in this case the tensile strength (Kg/mm$^2$), indicative of the mechanical strength, is sufficiently high as compared with a platinum resistance wire (alloy metal content is zero %) as shown in FIG. 14B. In the Figure, the curve A indicates the value of the completely annealed wire and the curve B indicates the value of the wire annealed at 500° C.

Figure 15A:
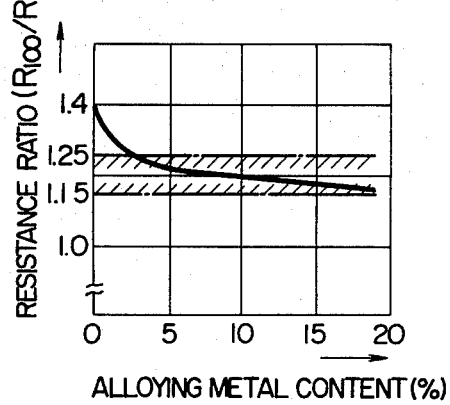
FIGS. 15A and 15B, FIGS. 16A and 16B, FIGS. 17A and 17B, and FIGS. 18A and 18B are respectively characterisic diagrams showing the relationship between the metal content and resistance ratio and between the metal content and tensile strength, of another resistance wires which are suitable for use with this invention.
Figure 15B:
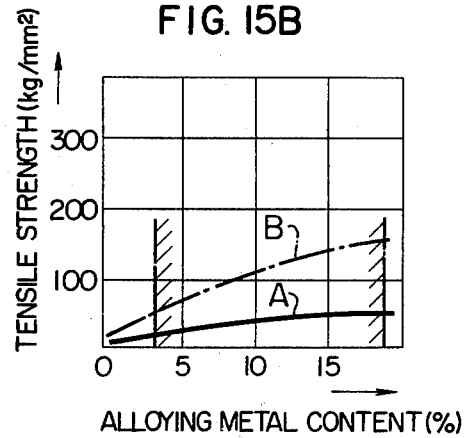
Figure 16A:
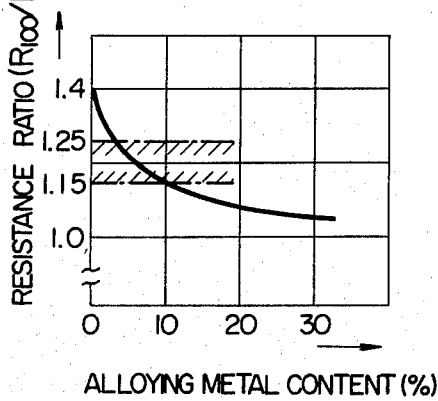
Figure 16B:
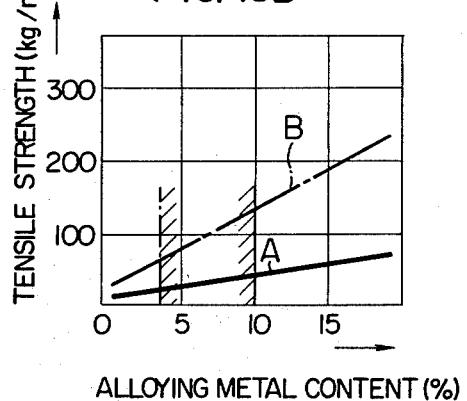
Figure 17A:
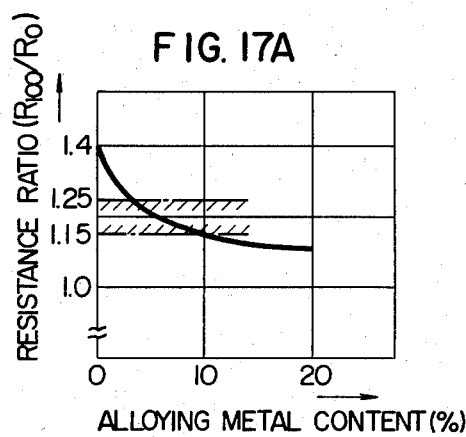
Figure 17B:
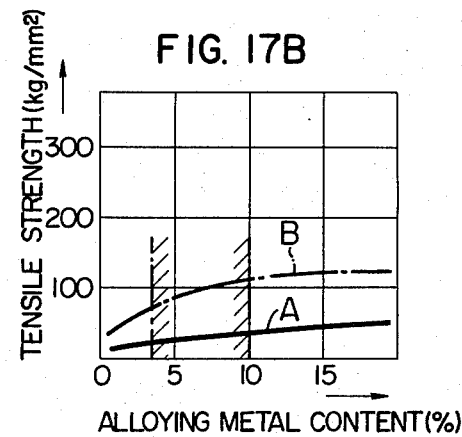
Figure 18A:
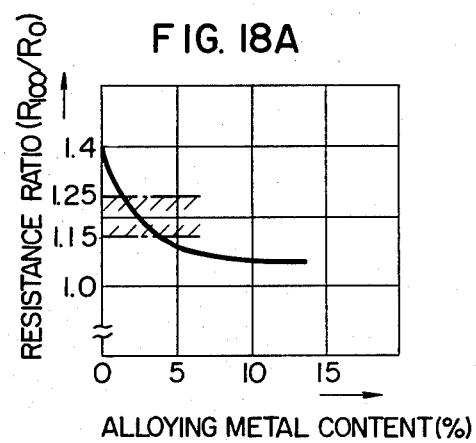
Figure 18B:
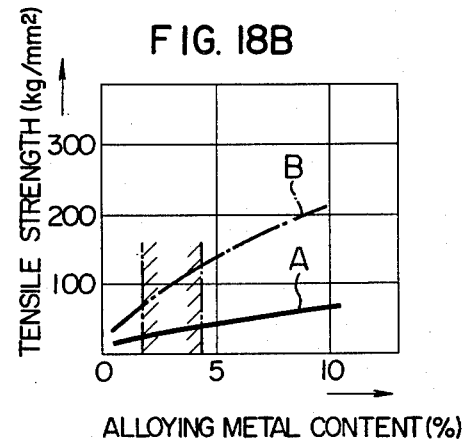

While, in the embodiments described above, each of the heater resistance wire 10b and the first and second temperature dependent resistance wires 11b and 12b is comprised of a platinum-nickel alloy resistance wire (nickel content is 3 to 8%), any other platinum alloy resistance wire containing such alloying metal as rhodium (Rh), iridium (Ir), palladium (Pd), ruthenium (Ru) or the like may also be used. The content of each of these metals is experimentally determined such that the mechanical strength is sufficiently high and the resistance ratio is held in the range of 1.15 to 1.25, that is, the rhodium content is 3 to 18% (FIG. 15A), the iridium content 3 to 10% (FIG. 16A), the palladium content 3 to 10% (FIG. 17A) and the ruthenium content 2 to 4% (FIG. 18A). FIGS. 15B, 16B, 17B and 18B respectively show the relationship between the contents of these alloying metals and the tensile strengths (the curve A indicates the value of the completely annealed wire and the curve B shows the value of the wire annealed at 500° C.).

While, in the embodiments described above, the invention is applied in a fuel injection engine, the invention can also be used in applications where the amount of exhaust gas recirculation, ignition timing advance or the like is controlled in accordance with the intake air flow rate in a carburetor type engine. Also the invention is not intended to be limited to engines and it is applicable to the measurement of flow rate of any other gases.

Further, while the measuring circuit 15 includes the linearizing circuit 17, an ROM (read-only memory) may be used for digital signal processing purposes, and it is also possible to eliminate the linearizing circuit 17 if the generation of a linear output is not needed.

We claim:

1. A gas flow measuring device comprising:
pipe means for directing flow of a gas whose flow rate is to be measured;
an electric heater disposed within said pipe means;
a first temperature dependent resistor disposed within said pipe means downstream of said electric heater;
a second temperature dependent resistor disposed within said pipe means, at a position suffering substantially no influence of heat from said electric heater;
each of said first and second temperature dependent resistors and said electric heater includes a resistance wire of a platinum alloy;
wherein platinum is alloyed with a metal chosen from the group consisting of rhodium, iridium, palladium, ruthenium, and nickel;
a measuring circuit connected to said first and second temperature dependent resistors and to said electric heater to generate an output voltage indicative of the flow rate of the gas depending on the resistance values of said first and second temperature dependent resistors, said measuring circuit including at least two reference resistors constituting a bridge circuit together with said first and second temperature dependent resistors; and
each of said at least two reference resistors of said bridge circuit including a film resistor deposited on an insulating base.

2. The device of claim 1 wherein said platinum alloy is selected from the group consisting of platinum alloyed with 3 to 8% nickel, platinum alloyed with 3 to 18% rhodium, platinum alloyed with 3 to 10% iridium, platinum alloyed with 3 to 10% palladium, and platinum alloyed with 2 to 4% ruthenium.

3. A gas flow measuring device comprising:

pipe means for directing flow of a gas whose flow rate is to be measured;

an electric heater element disposed within said pipe means;

a first temperature dependent resistor disposed within said pipe means downstream of said heater element;

a second temperature dependent resistor disposed within said pipe means upstream of said heater element, said heater element and said first and second temperature dependent resistors being all arranged in a lattice pattern within said pipe means; and a measuring circuit connected to said first and second temperature dependent resistors and to said heater element to generate an output voltage indicative of the flow rate of the gas depending on the resistance values of said first and second temperature dependent resistors, said measuring circuit including an insulating base plate, a strip shaped conductor disposed on said insulating base plate, first and second reference film resistors deposited on said base plate and connected to said conductor, said first and second temperature dependent resistors and said first and second film resistors constituting a bridge circuit, and said measuring circuit being located on an outer periphery of said pipe means so that it may not be affected by the heat of said heater element.

4. A gas flow measuring device according to claim 3, wherein each of said first and second temperature dependent resistors and said electric heater includes a resistance wire of a platinum alloy including platinum and a predetermined proportion of at least one other metal and having a predetermined temperature coefficient and a predetermined mechanical strength.

5. A gas flow measuring device according to claim 4, wherein each of said first and second temperature dependent resistors and said electric heater includes a resistance wire of a platinum alloy including platinum and 3 to 8% of nickel.

6. A gas flow measuring device according to claim 4, wherein each of said first and second temperature dependent resistors and said electric heater includes a resistance wire of a platinum alloy including platinum and 3 to 18% of rhodium.

7. A gas flow measuring device according to claim 4, wherein each of said first and second temperature dependent resistors and said electric heater includes a resistance wire of a platinum alloy including platinum and 3 to 10% of iridium.

8. A gas flow measuring device according to claim 4, wherein each of said first and second temperature dependent resistors and said electric heater includes a resistance wire of a platinum alloy including platinum and 3 to 10% of palladium.

9. A gas flow measuring device according to claim 4, wherein each of said first and second temperature dependent resistors and said electric heater includes a resistance wire of a platinum alloy including platinum and 2 to 4% of ruthenium.

* * * * *